United States Patent [19]
Struble

[11] Patent Number: 5,941,422
[45] Date of Patent: Aug. 24, 1999

[54] LIQUID CONTAINING AND DISPENSING PACKAGE

[75] Inventor: Douglas S. Struble, Maumee, Ohio

[73] Assignee: Owens-Brockway Plastic Products Inc., Toledo, Ohio

[21] Appl. No.: 09/055,513

[22] Filed: Apr. 6, 1998

[51] Int. Cl.⁶ .................................................. B67D 1/16
[52] U.S. Cl. .......................................... 222/109; 222/571
[58] Field of Search .................................. 222/109, 568, 222/571

[56] References Cited

U.S. PATENT DOCUMENTS

| | | |
|---|---|---|
| 4,640,855 | 2/1987 | St. Clair . |
| 4,671,421 | 6/1987 | Reiber et al. . |
| 4,696,416 | 9/1987 | Muckenfuhs . |
| 4,802,597 | 2/1989 | Dubach . |
| 4,863,067 | 9/1989 | Krall . |
| 4,890,768 | 1/1990 | Robinson . |
| 4,917,268 | 4/1990 | Campell et al. ......................... 222/109 |
| 4,917,269 | 4/1990 | Fuchs et al. . |
| 4,934,548 | 6/1990 | Hsu . |
| 4,981,239 | 1/1991 | Cappel et al. . |
| 5,020,692 | 6/1991 | Darr . |
| 5,058,772 | 10/1991 | Moore et al. ............................ 222/109 |
| 5,108,009 | 4/1992 | Davidson et al. ....................... 222/571 |
| 5,114,659 | 5/1992 | Krall . |
| 5,462,202 | 10/1995 | Haffner et al. . |
| 5,603,787 | 2/1997 | Reid . |

*Primary Examiner*—Philippe Derakshani

[57] ABSTRACT

A combined drain back spout (DBS) fitment and plastic container assembly comprising a plastic container body and finish and a plastic drain back spout fitment having a pour spout connected to a surrounding drain gutter and spill-catching apron. The fitment apron has an integral mounting collar with a radial flange spanning the finish end edge and a collar skirt dependent therefrom and encircling the outer surface of the container finish and being sealably joined thereto by a spin weld joint. The lower free end edge of collar skirt is closely spaced from the juxtaposed surface of the container body, and the collar skirt and finish exterior surface conjointly define an intervening space for receiving, containing and hiding spin weld slag and/or shavings. The finish is corrugated to provide annular external ribs and intervening external grooves to thereby provide sacrificial parent spin weld material in the rib crowns and slag-receiving spaces in the grooves.

23 Claims, 2 Drawing Sheets

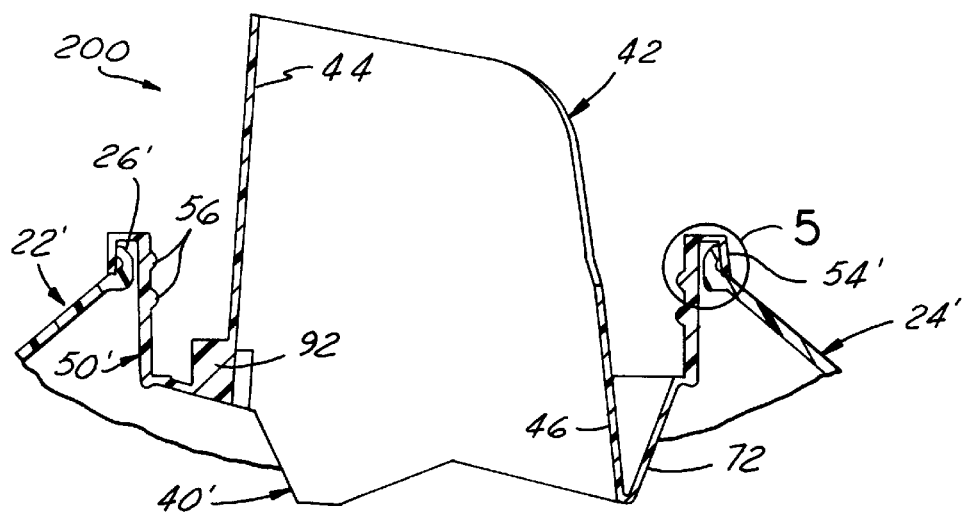
FIG.4
FIG.5
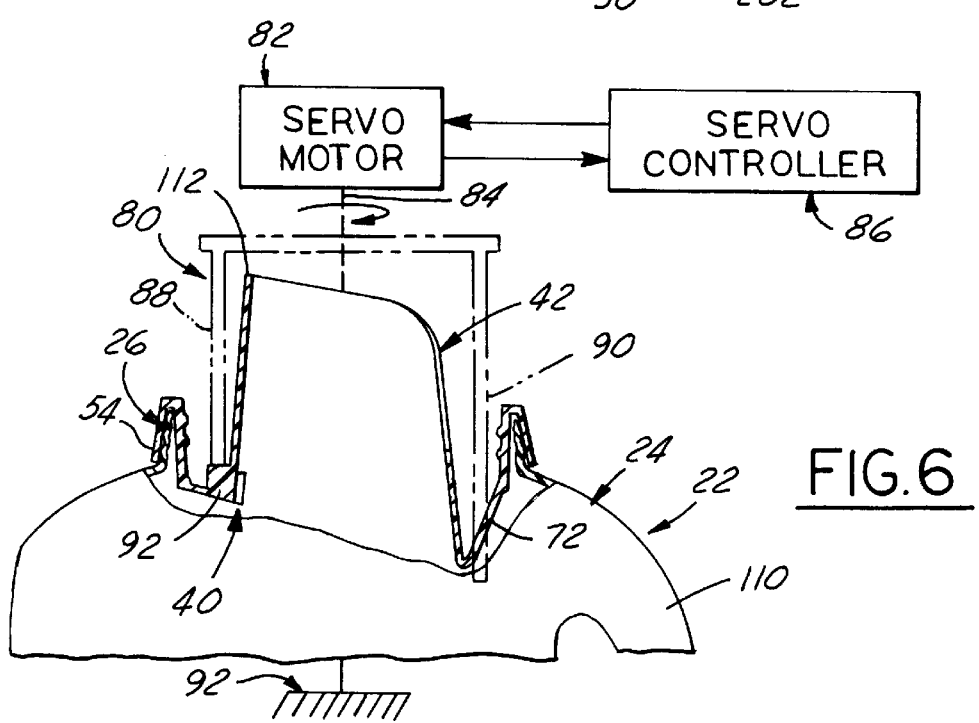
FIG.6

LIQUID CONTAINING AND DISPENSING PACKAGE

FIELD OF THE INVENTION

This invention relates to liquid containing and dispensing packages and more particularly to such packages which include a pouring spout and a closure that functions as a measuring cup.

BACKGROUND OF THE INVENTION

In one widely-used commercial type of liquid containing and dispensing package, a pouring spout fitment is positioned on the neck of the container and a closure in the form of a combined cap and dispensing cup is removably interengaged with the periphery of the container spout fitment. The fitment has an integrally formed axially protruding dispensing spout, and the fitment also has threads which are engaged by threads on the cap/dispensing cup.

For example, Reiber et al U.S. Pat. No. 4,671,421 (incorporated herein by reference) shows a plastic liquid containing and dispensing package which comprises a plastic blow molded container having an annular finish, an insert pour spout fitment positioned in the finish and interengaged with the internal surface of the finish and fixed thereto as by spin welding. The spout fitment has internal threads for threadably receiving external threads on an enlarged closure in the form of a combination cap and self-draining measuring cup. The cap/cup has a peripheral external flange adapted to sealingly engage the free end of the finish when the cap/cup is fully threaded down on the fitment.

Another example of this type of dispensing package is that disclosed in Haffner et al U.S. Pat. No. 5,462,202 (also incorporated herein by reference) which includes a liquid spout dispensing fitment for installation on a container neck and cooperable therewith to provide a drain back system (DBS) package. This fitment comprises a plastic body having an axial pour spout extending from within and protruding beyond the neck of the associated container. The fitment body has an outer annular apron wall spaced from the spout for catching spout spillage and for mounting the fitment on the container. An integral annular trench portion connects the spout and apron walls and provides a drain-back gutter. The gutter portion of the fitment is inclined with respect to the axis of the spout and has its lowermost portion aligned with the slot opening in a C-shaped portion of said spout. The fitment apron wall has an axial opening that defines a combined drain back opening and a near-empty pour out hole. The fitment is provided with container attachment means on the upper end of its outer wall for engaging the inner surface of the container neck. The lower portion of the spout is substantially smooth in an axial direction to facilitate drain back.

The DBS pour spout fitment for such containers is typically initially made as a separate component from the container component and these separately-made components are then permanently assembled together by a liquid-tight joint, such as formed by an adhesive bond, solvent bond, sonic weld or a friction weld (commonly referred to as a spin weld). Spin welding has certain commonly recognized advantages over such other methods of permanent joinder such as: (a) lower cost, since no bonding material is required; (b) rapid cycle times for automated mass production, and (c) does not affect recycling concerns.

However, the friction welding operation is disadvantageous in that it generates plastic shavings and/or melt slag. If the plastic shavings and/or slag are not collected and retained, they may either fall into the container, and potentially contaminate the contents therein, or otherwise be seen by and present an objectionable appearance to the package end user.

One approach to solving this problem of the friction welded shavings is that shown in U.S. Pat. No. 4,981,239 wherein the pour spout is made integrally with the container neck and body and is encircled by a separate cylindrical liquid spill-retaining collar affixed by friction or spin welding and that cooperates with annular drain channels in the container neck to provide liquid drain back channels as well as serving as flash traps to collect plastic shavings generated by the friction welding process.

OBJECTS OF THE INVENTION

Among the objectives of the present invention are to provide an improved DBS liquid containing and dispensing package wherein the pour spout fitment, as well as the closure cap/liquid measuring dispenser, can be made as separate parts with the fitment containing the integral pour spout and drain back system, wherein the fitment is permanently joined to the neck of the container in assembly by friction (spin) welding to produce a spin weld sealed joint on the outside of the container, thereby eliminating the chance of plastic shavings or friction welding slag entering or falling into the container during the spin welding assembly fabrication step, wherein the fitment attachment joint does not require any other alternative or adjunct mode of permanent joinder, such as adhesive or solvent bonding, integral molding or sonic welding, and does not require any ancillary snap fit construction, wherein the fitment provides internal threads for cooperation with external threads on the open end of the dispenser cup, and wherein such an improved fitment is well adapted to being made in various configurations of DBS fitment designs and yet readily modified to adopt to the features of the invention.

Another object is to provide an improved method of assembly fabrication of the aforementioned package by spin welding of the pour spout fitment to the blow molded container that is reliable, rapid and automatically operable at high speed mass production rates to accurately orient the pour spout fitment as required with respect to the container configuration features, e.g., pour spout lip diametrically opposite container handle, and that insures a consistent and controlled placement of the fitment part to the container in final permanently joined and sealed condition.

SUMMARY OF THE INVENTION

In general, and by way of summary description and not by way of limitation, the invention accomplishes the foregoing as well as additional objects set forth hereinafter by providing an improved pour spout fitment-to-container mounting collar construction and method that enables various DBS cap pour spout features hitherto found advantageous to be retained while strengthening and yet simplifying package component assembly, and enables formation of the liquid-fight seal and mounting joint between the fitment and container to be made in a stronger and yet simpler and more economical manner. This is accomplished by forming in a conventional manner the pour spout, drip-catching apron, and drain back gutter portions of the fitment, but modifying in a novel manner the upper end of the apron porton to provide an endless "shirt-collar" termination for the upper end of the fitment apron. The collar outer wall encircles the outside of the container neck and finish which is also modified to cooperate therewith to form a liquid-tight permanent seal and support joint connection in the form of an autogenous weld formed by the so-called "spin-weld" friction welding process.

More particularly, the fitment collar and container finish are configured in accordance with the invention such that the only contact between the fitment and finish is in the zone of the weld joint and such is hidden beneath the collar outer wall as the same drapes down and terminates at a free annular end edge in close proximity to the juxtaposed surface of the container body. Spin weld slag and/or shavings are entrapped in the zone of the joint formation and hence hidden beneath the collar outer wall. Likewise such slag and/or shavings are prevented from entering the container during the welding process by a drop-on, spin-down method and structure of the joint formation.

Preferably one or more circumferentially continuous annular protuberances, such as external ribs, are provided on an exterior surface of the container finish, and the juxtaposed cooperative tapered inner surface of the collar outer wall is made smooth to initially loosely seat on the crown of the uppermost rib protuberance when the fitment apron is initially dropped into and seated by the fitment collar on the container finish. The crown of the protuberance provides the sacrificial plastic parent material melted during the friction welding process in forming the autogenous weld mounting joint construction.

With the foregoing fitment mounting construction, both initial and finished contact of the fitment with the container is limited to the zone of the hidden joint so formed beneath the collar outer wall. Preferably both the collar outer wall and container finish have complementary frusto-conical tapering configurations with their taper angles converging upwardly and away from the container body.

Preferably the spin welding process is performed by commercially available automated production equipment employing conventional fixturing for holding and rotating the fitment during spin welding as the container is supported stationarily. The fixture drive is by conventional precision servo motor and servo controller equipment programmed to identify, as by mechanical registry, through the fixturing, the fitment spout orientation relative to the control system and the container body, and then to terminate the spin welding operation upon completion of the joint as the fitment reaches final predetermined assembled position. The spout is thereby accurately angularly oriented in a predetermined relationship to the container body, such as the spout pour lip being diametrically opposed to an exterior container body handle.

Preferably the initial spin weld annular protuberance is provided on the container finish by forming it as a corrugated section of uniform thickness to thereby provide a plurality of annular ribs on its exterior surface that are thus separated by intervening annular external grooves that in turn provide spin weld flash traps. Alternatively, the container finish may be made with a smooth exterior surface and internal ribs provided on the facing surface of the collar outer wall.

Preferably the inner wall of the collar that forms the upper end continuation of the catch apron of the fitment, as well as the radial bridging wall between the collar inner and outer walls, do not contact the mutually facing surfaces of the container finish, either during drop-on loose assembly, initial spin on, or final affixation. Therefore no finishing operations are required on either the interior or end surfaces of the container finish, and likewise as to those surfaces of the fitment collar that face these surfaces in assembly. The typical clean-up operations following such finishing operations with respect to the container are likewise eliminated. When the spin weld ribs are formed by a corrugating the container finish, the same is strengthened and stiffened to provide a more secure fitment mount. The complementary taper of the collar and finish facilitates initial assembly, and temporary press on fit if desired, due to the resilience of the plastic material of the fitment and container. In addition, the initial taper contact between the collar outer wall inner surface and the uppermost finish rib provides a barrier during spin welding to prevent spin weld slag and shavings from traveling up and over into the opening of the container finish. With this fitment/container finish joint construction, internal threads may be readily provided at the upper end of the apron interior surface to cooperate with exterior threads on a cap/cup type closure removably attached to the fitment to provide a dispensing cup closure and thereby complete the improved liquid containing and dispensing package provided in accordance with the invention.

BRIEF DESCRIPTION OF THE DRAWINGS

The foregoing as well as other objects, features and advantages of the present invention will become apparent from the following detailed description of the best mode presently known to the inventors of making and using the invention, from the appended claims and from the accompanying drawings (which are to engineering scale unless otherwise indicated) wherein:

FIG. 4 is a fragmentary sectional view similar to FIG. 1 but illustrating a second embodiment of a liquid containing and dispensing package of the invention.

FIG. 5 is a fragmentary view of the portion of FIG. 4 encompassed by the circle 5 in FIG. 4 and greatly enlarged thereover.

FIG. 6 is a diagrammatic view of the spin welding apparatus as utilized in the fabrication step of the method of the invention as applied to the first embodiment package.

DETAILED DESCRIPTION OF THE FIRST EMBODIMENT

Figure 1:
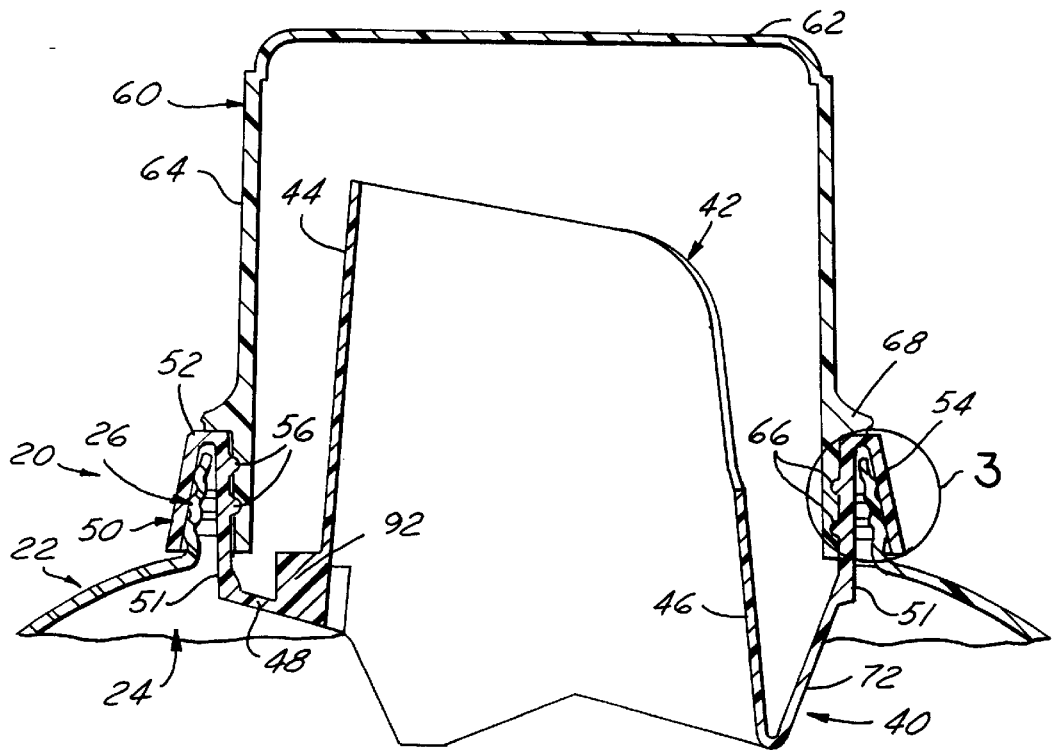
FIG. 1 is a fragmentary sectional view taken along the longitudinal center line axis of the container and associated DBS spout fitment and closure dispensing cap components of an exemplary but preferred embodiment of a liquid containing and dispensing package of the invention.

In accordance with the first embodiment of the invention shown in FIGS. 1–3 and 6, a container package 20 comprises a hollow plastic container 22 having a body 24 and a neck/finish 26 integral therewith, container 22 preferably being conventionally blow molded to essentially finished form. (As used herein, the term "integral" means a one-piece construction as molded.) Preferably the finish of neck 26 has a corrugated cross section defining three circumferentially continuous circular external ribs 28,30, 32. Ribs 28–32 preferably have a semi-circular configuration in radial cross section and define therebetween, axially of the neck, a pair of external grooves 34 and 36. Preferably neck 26 is tapered convergently toward its open end 38 at an angle say 10 degrees relative to the longitudinal axis of the container 22.

Package 20 further includes a DBS pour spout fitment or insert 40 having an integrally formed, centrally disposed pour spout portion 42 that has an arcuate upper pour lip portion 44 which is generally C-shaped in transverse section. Spout 42 has an annular lower portion 46 inclined at its lower gutter edge in a plane intersecting the container longitudinal axis at about 70 degrees, and this lower edge is integrally connected by a surrounding annular drain-back trough and apron wall 48 to the lower edge of the inner wall 51 of a circumferentially continuous circular neck-mounting collar 50. Collar inner wall 51 at its outer periphery has a clearance fit within the finish of container neck 26. Collar wall 51 is joined integrally at its upper edge to a radially outwardly extending collar flange 52. A downwardly and outwardly flaring collar outer skirt wall 54 is integrally dependent from flange 52 and has a smooth frusto-conical inner peripheral surface 56 inclined parallel to the taper angle of container finish 26. The inner periphery of collar inner wall 51 is provided with internal threads 56.

Package 20 further includes a closure 60 (FIG. 1) that forms a dispensing cup when separated from the package and oriented with its open end upright, and when threadably assembled to the package and oriented as an inverted cup forms the container closure cap. Closure 60 has a closed end wall 62, a cylindrical side wall 64, external thread grooves 66 cooperable with fitment internal threads 56, and a peripheral sealing flange 68 adapted to sealably seat on the radial seating surface 70 of fitment collar flange 52 when closure 60 is fully screwed down into the fitment collar as shown in FIG. 1.

Container 22 is preferably blow-molded from plastic material such as high density polyethylene. Fitment 40 may be injection molded from other plastic materials, for example, low density polyethylene. Closure cap/dispensing cup 60 may be injection molded from plastic material such as polypropylene.

Apron wall 48 of fitment 40 is provided with an axially extending opening or slot 72 that extends from a "low point" position of wall 48 (when package 20 is oriented in its normal, upright storage position) up to the lower edge of collar inner wall 51 to thereby define a combined drain back opening and near-empty pour out hole.

Figures 2, 3:
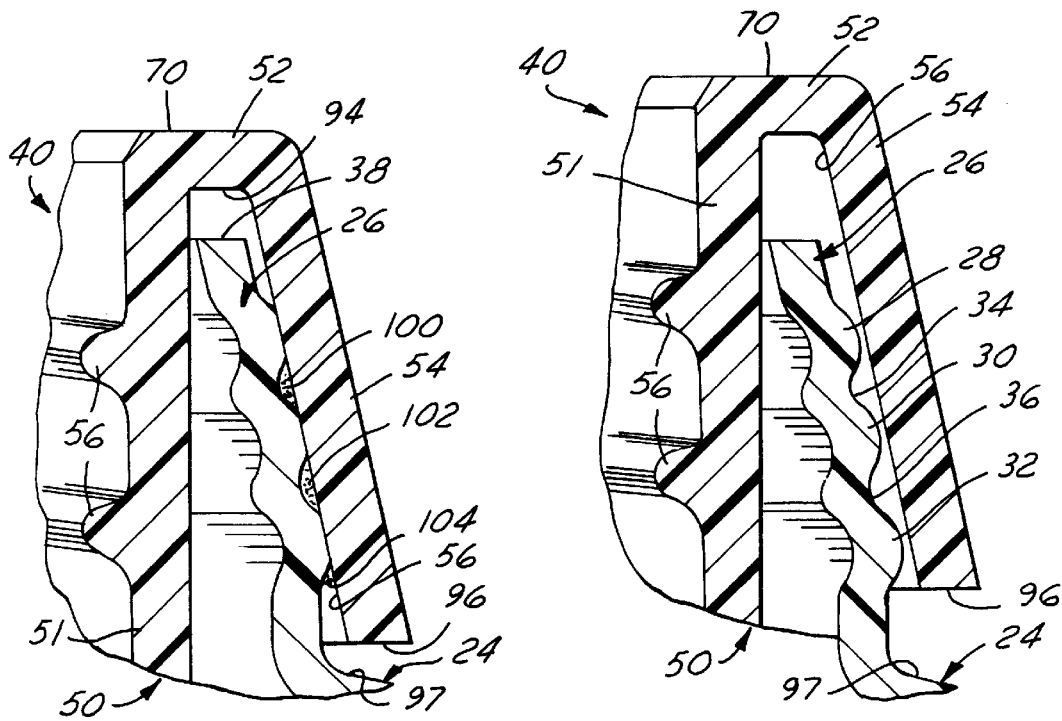
FIG. 2 is an enlarged fragmentary sectional view corresponding to that of FIG. 1 but showing the configuration of the fitment collar and container neck when being initially juxtaposed prior to seating and then spin weld joinder and assembly.
FIG. 3 is an enlarged fragmentary view of the portion encircled by the circle 3 in FIG. 1 and showing the fitment collar and container neck portions illustrated in FIG. 2 as they appear after completion of their sealed joinder by spin welding.

In the method of constructing container package 20 in accordance with the invention, the foregoing three components, namely, container 22, pour spout fitment 40, and closure cup/cap 60, are each manufactured as separate items to their finished form shown in FIGS. 1 and 2. Then, as indicated in FIG. 2, spout fitment 40 is loosely inserted into the open upper end of container neck 26 with inner surface 56 of collar skirt 54 loosely resting on at least the peak of uppermost circular rib 28, and preferably on all three ribs 28, 30 and 32. Due to the resilience of collar skirt 54, this initial drop-on assembly may be tightened by slight push down to effect a temporary press fit assembly, if desired to facilitate in-process transport and/or handling. The temporary assembly of container 22 and fitment 40 may then be transported automatically to a spin welding station shown in FIG. 6.

As indicated diagrammatically and schematically in FIG. 6, the spin welding station includes a conventional fitment spinning fixture 80 that is operably coupled to a precision servo motor 82 that rotatably drives fixture 80 about the rotational axis 84, and that also positionally advances the fixture along this axis in a predetermined manner. Both of these motions are predetermined by the electronic control computer program provided in a conventional servo controller 86 operably electrically coupled to servo motor 82. For example, as indicated schematically in FIG. 6, fixture 80 may have suitable drive fingers 88 and 90. One or more of the shorter fingers 88 may circumferentially abut one or more associated drive lugs 92 provided in the vicinity of the juncture of fitment walls 46 and 48 to thereby impart rotational torque to fitment 40. Finger 90 may be elongated and adapted to register and drop through drain back opening 72 as the fixture 80 is advanced axially downwardly into operable engagement with the loosely assembled fitment 40 on container 22 in the welding station. Once finger 90 is so registered in opening 72, the angular orientation of fitment 40 relative to the armature shaft of servo motor 82 is mechanically determined and then recorded and referenced as a known quantity by servo controller 86. Alternatively, as will be apparent to those skilled in the art, suitable conventional electro-optical digital pulse systems may be utilized in conjunction with the servo fixturing and control system to detect and register locate the salient fitment feature to be angularly oriented relative to the container body.

In the next step, fitment 40 is rotated about axis 84, which is coincident with the axis of container neck 26 and fitment neck 50 as well as collar 54. At the same time, a slight downward axial pressure is exerted on fitment 40 as container 22 is fixedly supported against such fitment rotational and axial forces, as indicated schematically by the support structure 92 in FIG. 6. During this downward friction welding motion, collar skirt surface 56 first contacts the convex crowns of ribs 28, 30, 32, thereby generating frictional heat sufficient to melt the sacrificial parent plastic material provided by the rib crowns. During this spinning motion, frictional rubbing continues as fitment 40 is forced axially downwardly relative to container 22 from a position slightly below that shown in FIG. 2 (wherein skirt surface 56 initially contacts the original as-molded crowns of ribs 28–32) to its final fully assembled and welded position of FIG. 3. In this final position, the undersurface 94 of collar flange 52 is disposed closely above but spaced from the upper edge 38 of the container finish opening of neck 26, and the lower edge 96 of collar skirt 54 remains slightly spaced above the juxtaposed surface 97 of container body 24, for example at an axial distance of about 0.002".

It will be noted that the flash or slag formed by melting of the crowns of ribs 28–32 (e.g., this slag being indicated at 100, 102 and 104 in FIG. 3) flows downwardly into, and is confined as it re-solidifies, to the root portions of grooves 34 and 36 as well as to the exterior surface area of neck 26 immediately below lowermost rib 32 and within the confined space between the lower edge 96 of skirt 54 and container neck 26. The re-solidified spin welding slag 100, 102 and 104 resulting from the friction welding operation thus remains hidden beneath collar skirt 54 and hence is concealed from view from the exterior of the container. Due to the conical shape of skirt 54 in initial and continuous barrier contact with uppermost rib 28, the slag melt is squeezed downwardly solely on the exterior surface of neck 26 during axially downward motion of collar 50 on neck 26 during the friction welding motion. Slag as well as solid shavings from the friction welding process are thus prevented from entering container body 24 via neck 26, both during and subsequent to the friction welding operation.

In accordance with a further feature of the method of the invention, the friction welding spinning sequence is automatically controlled in a predetermined manner by servo controller 86 being pre-programmed to cease axial advancement motion of fitment 40 relative to the axial position of container 22 in the fixture, and after a given predetermined number of spin revolutions. The final revolution is program control terminated to cease spinning movement of fitment 40 under the control of servo motor 82 and controller 86 when drain-back opening 72 is accurately angularly aligned diametrically of container body 24 with a carry-and-pour handle 110 of container 22. The most remote protruding lip edge 112 of pour spout 42 of fitment 40 is thus properly oriented on the container body 24 diametrically opposed to handle 110. The fitment 40 is thereby consistently permanently joined with good liquid sealing and permanent mount engagement with the container neck, and such controlled part placement is readily automatically achieved with conventional commercially available mass production container manufacturing equipment. It thus will be seen that a secure and leakproof joint between collar skirt 54 and container neck 26 is economically obtained in a rapid and reliable manner in accordance with this method.

Moreover, the corrugated configuration readily imparted to container neck 26 in blow molding of container 22 that provides the ribs 28–32 and grooves 34, 36 in order to furnish sacrificial plastic spin weld material and flash trap grooves also adds strength and stiffness to the neck 26. Hence as an added benefit container 22 is reinforced to better resist stresses imposed thereon by external forces applied to spout fitment 40 in use of package 20 either directly thereto when cap/cup 60 has been removed or as indirectly applied by cup 60 when secured in inverted fashion as a closure on fitment 40. The corrugation ribs also provide crowns to concentrate skirt unit pressure for accelerating generation of frictional heat to thereby reduce spin weld cycle time. These ribs also enhance the liquid sealing characteristics of the spin weld joint.

DETAILED DESCRIPTION OF THE SECOND EMBODIMENT

Referring to FIGS. 4 and 5, a second embodiment liquid containing and dispensing package 200 is illustrated wherein those components and elements identical to components and elements of first embodiment 20 are given like reference numerals, and those elements alike in structure and function are given like reference numerals raised by a prime suffix. Package 200 thus again comprises a modified container 22', modified spout fitment 40' and the unmodified closure cap/dispensing cup 60 of the first embodiment (not shown in FIGS. 4 and 5).

Modified container 22' may have the same body 24 as container 22, but is provided with a modified neck/finish 26' joined integrally to the upper end of body 22'. As best seen in FIG. 5, finish 26' comprises an annular radially inwardly extending annular portion 202 joined integrally to the upper end of body 24, an axially upwardly extending cylindrical portion 204 integrally joined toe inner periphery of radial portion 202, and a radially upwardly and outwardly divergently frusto-conical flange portion 206 having a radially extending upper ledge surface 38'. The exterior surfaces of finish portions 204 and 206 are formed with a circumferentially continuous external groove 208 having a contour and radial cross section as shown in FIG. 5. If desired, the outer peripheral edge surface 210 of finish flange 206 in its initial as-molded shape may be chamfered at an angle of say 20 degrees so as to be upwardly convergent with the longitudinal axis of container body 24 to enhance fitment press-on temporary assembly and to provide sacrificial spin-weld material.

The collar portion of spout fitment 40' is modified to provide a cap/cup-seal-seating radial flange 52' having a larger radial dimension than flange 52 of fitment 40 to accommodate the modified configuration of the container finish 26'. The downwardly dependent outer collar skirt 54' of fitment collar 50 also has a taper angle also convergent in an axially upward direction but of only say 5 degrees or less.

Fitment 40' is assembled and spin welded to container 22' in the same manner as in the first embodiment. During this friction welding process, the chamfered or beveled outer edge 210 provides the parent material for the spin welding, and the flash 100' thereby generated tends to collect as re-solidified slag on the mutually facing collar and groove surfaces 56' and 208', as indicated diagrammatically in FIG. 5. Again, this slag 100' is thus collected in an under-skirt area that is not visible from the exterior of the container. The slag is again also squeezed downwardly and dammed up in an entrapped area so that it is prevented from entering the interior of the container either during the spin welding process or thereafter. Likewise as to any solid shavings generated by the spin weld processing. Any loose slag or shaving debris will fall onto the exterior surface of container body 24 where it is readily removed by gravity fall-off, process blow-off or in normal downstream container package cleaning stations. Again, predetermined accurate angular orientation of fitment 40' is preferably achieved in the manner described in conjunction with the fixture and servo control motor spin welding equipment and method described hereinabove with reference to FIG. 6.

From the foregoing description, it will now be seen that the liquid containing and dispensing packages 20 and 200 and method of making the same in accordance with the invention amply fulfill the aforestated objects and provide many advantages and features over the prior art. Due to the mutually tapering friction welding surfaces of the spout fitment collar and exterior of the container finish, self-aligning drop-on initial assembly is facilitated, which may be either a loose or a temporary press fit, as desired. No weld surface preparation prior to welding is needed, and hence the usual prior operations of reaming, machining and mechanical surface work on such spin welding surfaces when disposed interiorly of the finish are eliminated. Likewise no post weld blowout or container body vacuuming apparatus is required. A liquid tight and secure mechanical joint is obtained between the pour spout fitment and container components of the package. The finish configuration of the container component is simplified to thereby reduce the cost of blow molding equipment and processing. The corrugations 28–36 in the container body finish 26, or the frusto-conical flange 206 in modified finish 26', provide reinforcement for stiffening and strengthening the finish for the spin welding process as well as subsequent structural enhancement for resisting end use external stresses that may be imposed on the fitment.

Accurate and consistent angular alignment of the spout fitment with the container is readily achieved with conventional automatic fixturing and control and drive equipment. The advantages of providing internal threads on the spout fitment and external thread grooves on the cup closure are retained. In addition, spin welding performed on the outside, rather than on tie inside, of the bottle or container enables better (more remote and container-isolated) flash and slag traps to be provided along with obtaining a more positive fitment seating detail. The aesthetics of the spout and overall container package is more pleasing due to the smooth outward appearance of the fitment collar 50, 50' covering the container finish. Also these fitment collars can be made relatively short and tapered, with a fairly wide range of variation being possible in the taper angle. Moreover, since the fitment collar and container finish are always clearance spaced from one another except at their mutual contact zones in the spin weld joint, larger manufacturing dimensional and surface finish tolerances can be utilized in such component clearance areas to thereby further reduce manufacturing costs.

I claim:

1. A combined drain back spout fitment and plastic container assembly comprising in combination:

(a) a plastic container having a body and a fitment finish, said finish comprising a generally radial inwardly extending wall connected to said body and an axially outwardly extending neck wall integral with said radial wall and extending axially outwardly with respect to said body and terminating at an annular free end edge, and (b) a one piece plastic drain back spout fitment comprising an annular wall, an integral spout connected to said annular wall, a surrounding apron wall extending radially outwardly and upwardly integrally from said annular wall, and an annular fitment mounting collar having a collar interior wall extending axially upwardly integrally from said apron wall, a collar flange spanning said finish free end edge and extending radially outwardly integrally from said collar interior wall and a collar exterior skirt wall integrally dependent from said collar flange and encircling the outer surface of said container finish and being sealably joined thereto by a spin weld joint.

2. The combination set forth in claim 1 wherein said collar skirt wall extends axially downwardly to an annular free end edge thereof disposed in close proximity to said radial wall of said container finish.

3. The combination set forth in claim 2 wherein said collar skirt wall and said finish are constructed and arranged to define an intervening space for receiving and containing spin weld slag.

4. The combination set forth in claim 3 wherein said collar skirt free end edge and said container finish radial wall are at close proximity of about 0.002".

5. The combination set forth in claim 3 wherein said finish is configured to provide at least one external circumferentially continuous annular protuberance proximate said finish free end edge and at least one slag receiving annular external groove immediately subjacent said annular protuberance to provide said slag-receiving intervening space.

6. The combination set forth in claim 1 wherein one of the mutually facing surfaces of said fitment collar skirt wall and said finish is corrugated in radial cross-section to thereby define a plurality of circumferentially continuous radially protruding ribs and axially intervening grooves such that a crown of at least one of said ribs provides spin weld parent material and at least one of said grooves provides space for receiving and retaining any spin weld slag and/or shavings generated by forming said spin weld.

7. The combination set forth in claim 6 wherein said one corrugated surface is disposed on the exterior of said finish.

8. The combination set forth in claim 7 wherein said mutually facing surface of said fitment collar skirt wall is smooth.

9. The combination set forth in claim 8 wherein said finish is corrugated in radial cross-section and is of uniform radial thickness to thereby form said one corrugated surface on the exterior thereof.

10. The combination set forth in claim 6 wherein said mutually facing surfaces are complementarily inclined to convergently taper in said axially outward direction with respect to said container body.

11. The combination set forth in claim 1 wherein said fitment has internal thread means thereon adapted to cooperate with an external thread on a cap/cup closure provided for said fitment.

12. The method of making a combined drain back spout fitment and plastic container assembly comprising the steps of:

(a) forming a plastic container having a body and a fitment finish, said finish comprising a generally radial inwardly extending wall connected to said body and an axially outwardly extending neck wall integral with said radial wall and extending axially outwardly with respect to said body and terminating at an annular free end edge, and (b) forming a one piece plastic drain back spout fitment comprising an annular wall, an integral spout connected to said annular wall, a surrounding apron wall extending radially outwardly and upwardly integrally from said annular wall, and an annular fitment mounting collar having a collar interior wall extending axially upwardly integrally from said apron wall, a collar flange adapted in assembly to span said finish free end and extending radially outwardly integrally from said collar interior wall and a collar exterior skirt wall integrally dependent from said collar flange and constructed to encircle the outer surface of said container finish in assembly therewith for being sealably joined thereto by a spin weld joint, (c) inserting said fitment into said finish, and (d) spin welding the outer surface of said container finish to the inner surface of said collar skirt wall.

13. The method set forth in claim 12 wherein said collar skirt wall extends axially downwardly to an annular free end edge thereof and steps (c) and (d) are performed to finally dispose the collar skirt wall free end edge in close proximity to said radial wall of said container finish.

14. The method set forth in claim 13 including forming said collar exterior skirt wall and said finish to define in steps (c) and (d) an intervening space therebetween for receiving and containing spin weld slag and/or shavings.

15. The method set forth in claim 14 including forming said collar skirt free end edge and said container finish radial wall such that the close proximity comprises a clearance space of about 0.002".

16. The method set forth in claim 14 including forming said finish to provide at least one external circumferentially continuous annular protuberance proximate said finish free end edge and at least one slag receiving annular external groove immediately subjacent said protuberance to provide said slag-receiving intervening space.

17. The method set forth in claim 12 including forming one of the mutually facing surfaces of said fitment collar skirt wall and said finish so as to be corrugated in radial cross-section to thereby define a plurality of circumferentially continuous radially protruding ribs and axially intervening grooves such that the crowns of said ribs provide spin weld parent material and said grooves provide spaces for receiving and retaining any spin weld slag and/or shavings generated by said spin weld.

18. The method set forth in claim 17 including forming said one corrugated surface on the exterior of said finish.

19. The method set forth in claim 18 including forming said mutually facing surface of said fitment collar skirt wall as a smooth surface.

20. The method set forth in claim 19 including forming said finish to be corrugated in radial cross-section and of uniform radial thickness to thereby form said one corrugated surface on the exterior thereof.

21. The method set forth in claim 12 including forming said mutually facing surfaces to be complementarily inclined to convergently taper in said axially outward direction with respect to said container body.

22. The method set forth in claim 12 forming said fitment with internal thread means thereon adapted to cooperate with external thread means on an associated cap/cup closure provided for said fitment.

23. The method set forth in claim 12 including forming said fitment spout with a pouring lip termination at its open outlet end, and wherein said container body is formed with an external feature to be oriented in a predetermined angular relationship about the longitudinal axis of said body and relative to the final assembled orientation of said spout lip on said container body, and wherein said at least spin welding step (d) is performed by providing a fitment spin fixture means operable to engage and angularly register with said fitment, identify the angular location of said pouring lip and to rotatably drive and axially press the fitment onto final spin-weld assembled position on the container body, and is further performed by utilizing servo motor and servo controller means operably feedback coupled to the spin fixture means and operably programmed to terminate fitment insertion and rotation in the spin welding operation when the same is completed and with said pouring lip positioned in said predetermined angular relationship.

* * * * *